US007650350B1

(12) United States Patent  (10) Patent No.: US 7,650,350 B1
Garthwaite  (45) Date of Patent: Jan. 19, 2010

(54) METHOD AND APPARATUS FOR CONCURRENTLY PROCESSING REMEMBERED SETS IN A SPACE-INCREMENTAL GARBAGE COLLECTOR

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 981 days.

(21) Appl. No.: 11/131,827

(22) Filed: May 18, 2005

(51) Int. Cl.
*G06F 17/00* (2006.01)
(52) U.S. Cl. .................. 707/101; 707/102; 707/103 R; 707/104.1; 707/206
(58) Field of Classification Search ............... 707/1–10, 707/100–104.1, 200–206
See application file for complete search history.

(56) References Cited

U.S. PATENT DOCUMENTS

| | | | |
|---|---|---|---|
| 5,920,876 | A | 7/1999 | Ungar et al. |
| 6,115,782 | A | 9/2000 | Wolczko et al. |
| 6,148,310 | A | 11/2000 | Azagury et al. |
| 6,173,294 | B1 | 1/2001 | Azagury et al. |
| 6,185,581 | B1 | 2/2001 | Garthwaite |
| 6,226,653 | B1 | 5/2001 | Alpern et al. |
| 6,243,720 | B1 | 6/2001 | Munter et al. |
| 6,308,185 | B1 | 10/2001 | Grarup et al. |
| 6,363,403 | B1 | 3/2002 | Roy et al. |
| 6,381,738 | B1 | 4/2002 | Choi et al. |
| 6,424,977 | B1 | 7/2002 | Garthwaite |
| 6,434,576 | B1 | 8/2002 | Garthwaite |
| 6,449,626 | B1 | 9/2002 | Garthwaite et al. |
| 6,453,466 | B1 | 9/2002 | Eidt et al. |
| 6,457,019 | B1 | 9/2002 | Sexton et al. |
| 6,490,599 | B2 | 12/2002 | Kolodner et al. |
| 6,826,757 | B2 | 11/2004 | Steele et al. |
| 6,845,437 | B2 | 1/2005 | Borman et al. |
| 6,868,488 | B2 | 3/2005 | Garthwaite |
| 2004/0003014 | A1 | 1/2004 | Nagarajan et al. |
| 2004/0088339 | A1 | 5/2004 | Garthwaite |

OTHER PUBLICATIONS

Appel, "Simple Generational Garbage Collection and Fast Allocation", Software Practice and Experience, 19(2), 1989, 171-183.
Appel, et al., "Real-Time Concurrent Collection on Stock Multiprocessors", ACM SIGPLAN Notices, 1988.

(Continued)

*Primary Examiner*—Isaac M Woo
(74) *Attorney, Agent, or Firm*—Osha • Liang LLP

(57) ABSTRACT

In a space incremental garbage collector, delays caused by scanning remembered sets are reduced by scanning the remembered sets mostly concurrently with the operation of the non-collection threads. Before scanning, remembered sets associated with regions in some collection set are "sequestered" (no further insertions are allowed by the non-collection threads or the collector) in order to prevent further changes. Any further changes to these sequestered remembered sets that occur before phase two of the scanning process are then handled by one or more "refinement threads." Each refinement thread is a thread that can record reference locations in remembered sets, scan entries in collection set remembered sets and update reference location lists for use in the aforementioned second phase of remembered set processing. The refinement threads operate concurrently with the operation of the non-collection threads.

29 Claims, 6 Drawing Sheets

OTHER PUBLICATIONS

Bacon, et al., "Java without the Coffee Breaks: A nonintrusive Multiprocessor Garbage Collector", SIGPLAN Conference on Programming Language Design and Implementation, Jun. 2001, Snowbird, UT.

Baker, "List Processing in Real Time on a Serial Computer", Communications of the ACM 21, Apr. 1978, 280-294.

Brooks, "Trading Data Space for Reduced Time and Code Space in Real-Time Garbage Collection on Stock Hardware", Proceedings of the 1984 Acm Symposium on Lisp and Funcional Programming, Aug. 1984, 108-113, Austin, TX.

Chilimbi, et al., "Using Generational Garbage Collection to Implement Cache-Conscious Data Placement", International Symposium on Memory Management, Oct. 1998.

Clark, et al., "Compacting Garbage Collection can be Fast and Simple", Software-Practice and Experience, vol. 26, No. 2, Feb. 1996, 177-194.

Courts, "Improving Locality of Reference in a Garbage-Collecting Memory Management System", Communications of the ACM, vol. 31, No. 9, Sep. 1988, 1128-1138.

Grarup, et al., "Incremental Mature Garbage Collection", M.Sc.Thesis @ http://www.daimi.aau.dk/jacobse/Papers, Aug. 1993.

Herlihy, et al., "Lock-Free Garbage Collection for Multiprocessors", ACM SPAA, 1991, 229-236.

Holzle, Urs, "A Fast Write Barrier for Generational Garbage Collectors", Workshop on Garbage Collection in Object Oriented Systems, Oct. 1993.

Hosking, et al., "Remembered Sets Can Also Play Cards", OOPSLA/ECOOP Workshop on Garbage Collection in Object-Oriented Systems, Oct. 1993.

Hosking, et al., "Protection Traps and Alternatives for Memory Management of an Object-Oriented Language", Object Systems Laboratory, Dec. 1993, 1-14, Dept. of Comp. Sci., Amherst, MA.

Hudson, et al., "Incremental Collection of Mature Objects", Proceedings of the Int'l Workshop on Memory Managment, 1992, pp. 1-16, Springer-Verlag.

Hudson, et al., "Adaptive Garbage Collection for Modula-3 and Small Talk", OOPSLA.ECOOP '90 Workshop on Garbage Collection in Object-Oriented Systems, Oct. 27, 1990.

Hudson, et al., "Sapphire: Copying GC Without Stopping the World", Java Grande/ISCOPE, 2001.

Jones and Lins, "Garbage Collection: Algorithms for Automatic Dynamic Memory Management", 1996, 165-179, John Wiley and Sons, NY.

Lieberman, et al., "A Real-Time Garbage Collector Based on the Lifetimes of Objects", Communications of the ACM, 1983, 26(6).

Moon, "Garbage Collection in a Large Lisp System", Conference Record of the 1984 ACM Symposium on LISP and Functional Programming, Aug. 1984, 235-246, Austin, TX.

Nettles, Scott, "Real-Time Replication Garbage Collection", Avionics Lab, Wright Research and Development Center, 1993, PDDI.

Seligmann, et al., "Incremental Mature Garbage Collection, In the European Conference on Object-Oriented Programming", M.Sc. Thesis @ http://www.daimi.aau.dk/jacobse/Papers/, 1995.

Sobalvarro, "A Lifetime-based Garbage Collector for LISP Systems on General-Purpose Computers", Department of Electrical Engineering and Computer Science at MIT, Sep. 1988, AITR-1417.

Stamos, "Static Grouping of Small Objects to Enhance Performance of a Paged Virtual Memory", ACM Transactions on Computer Systems, vol. 2, No. 2, May 1984, 155-180.

Ungar, "Generation Scavenging: A Non-Disruptive High Performance Storage Reclaration Algorithm", ACM SIGPLAN Notices, Apr. 1984, 19(5).

Wilson, "Uniprocessor Garbage Collection Techniques", Technical Report, University of Texas, 1994.

Withington, P.T., "How Real is "Real-Time" GC?", Symbolics, Inc., Oct. 6, 1991, Burlington, MA.

Zorn, Benjamin, "Barrier Methods for Garbage Collection", Dept. of Computer Science, Uni. of Colorado, Nov. 1990, 1-37, Boulder.

Hosking, et al., "A Comparative Performance Evaluation of Write Barrier Implementations", OOPSLA; ACM Conference on Object-Oriented Systems, Languages and Applications, Oct. 1992, V. 27(10), ACM Press, Vancouver, Canada.

Lam, et al., "Object Type Directed Garbage Collection to Improve Locality", Proceedings of the International Workshop on Memory Management, Sep. 1992, 404-425, St. Malo, France.

Pirinen, Pekka, "Barrier Techniques for Incremental Tracing", Harlequin Limited, Date Unknown, 20-25, Cambridge, Great Britain.

Wilson, et al., "Effective Static-Graph Reorganization to Improve Locality in Garbage Collected Systems", Proceedings of ACM SIGPLAN Conference on Programming Language Design and Implementation, Jun. 1991, Canada.

Detlefs, et al., "Concurrent Remembered Set Refinement in Generational Garbage Collection", Proceedings of the USENIX Java VM '02 Conference, Aug. 1-2, 2002, 14 pages, San Francisco, CA, USA.

Ben-Yitzhak, O., et al, "An Algorithm for Parallel Incremental Compaction", ISMM'02, Jun. 20-21, 2002, 5 pages.

Detlefs, D., et al. "Garbage-First Garbage Collection", Sun Microsystems, Inc., ISMM '04, Oct. 24-25, 2004, 12 pages.

METHOD AND APPARATUS FOR CONCURRENTLY PROCESSING REMEMBERED SETS IN A SPACE-INCREMENTAL GARBAGE COLLECTOR

BACKGROUND

This invention relates to automatic reclamation of allocated, but unused memory, or garbage, in a computer system that uses a space-incremental garbage collector to collect an object space concurrently with the operation of non-collection threads. Memory reclamation may be carried out by a special purpose garbage collection algorithm that locates and reclaims memory which is unused, but has not been explicitly de-allocated. There are many known garbage collection algorithms, including reference counting, mark-sweep, mark-compact and generational garbage collection algorithms. These, and other garbage collection techniques, are described in detail in a book entitled "Garbage Collection, Algorithms for Automatic Dynamic Memory Management" by Richard Jones and Raphael Lins, John Wiley & Sons, 1996.

However, many of the aforementioned garbage collection techniques often lead to long and unpredictable delays because normal processing must be suspended during the garbage collection process (called "stop the world" or STW processing) and these collectors scan the entire heap. The garbage collection process is performed by collection threads that perform collection work when all other threads are stopped. Non-collection threads perform tasks for the application. Therefore, they are generally not suitable in situations, such as real-time or interactive systems, where non-disruptive behavior is of greatest importance. Conventional generational collection techniques alleviate these delays somewhat by concentrating collection efforts on small memory areas, called "young" generations in which most of the activity occurs. This concentration reduces the need for collecting the remaining large memory area, called the "old" or "mature" generation and, thus, reduces the time consumed during garbage collection, but does not eliminate it.

When the mature generation is eventually collected, many generational techniques lead to pauses in normal operation which, while less frequent, are still highly disruptive. One approach to eliminate these long pauses is to apply a space-incremental technique to regions in the heap containing older objects. Space-incremental collection techniques allow a subset of objects in the heap to be collected and evacuated independently of the rest of the heap. A given subset consists of one or more possibly noncontiguous regions and forms the collection-set. Examples of such techniques include the Train algorithm as described in "Incremental Collection of Mature Objects", R. L. Hudson, J. E. B. Moss, *Proceedings of the International Workshop on Memory Management*, volume 637 of *Lecture Notes in Computer Science*, St. Malo, France, pp 388-403, 1992, Springer-Verlag, London, Great Britain; the Garbage-first algorithm as described in "Garbage-First Garbage Collection", D. Detlefs, C. Flood, S. Heller, A. Printezis, *Proceedings of the 4th International Symposium on Memory Management*, pp 37-48, 2004 and other techniques allowing partial compaction of the heap as described in "An Algorithm for Parallel Incremental Compaction", O. Ben-Yitzhak, I. Goft, E. K. Kolodner, K. Kuiper, V. Leikehman, *Proceedings of the 3rd International Symposium on Memory Management*, pp 100-105, 2002.

As an example, the Train algorithm divides the generation's memory into a number of fixed-sized regions, or car sections. The algorithm associates a car structure with each car section to manage information about the state of that car section. It further orders the car structures in a two-level ordering. During at least some of the collection pauses, one or more of the cars lowest in the overall order are collected; these form the collection-set. Using this ordering and careful placement policies, the algorithm allows the size of collection-sets to be bounded to achieve acceptable pause times even as it guarantees that unreachable data structures too large to fit into a collection-set will be isolated in single trains, and once there, reclaimed as a group. Incremental collectors, such as the Train algorithm, are attractive because they reduce the delays inherent in the collection process. In addition, they are suitable for concurrent garbage collection systems in which collection is performed concurrently with the application by at least one concurrent thread or by different processors in a multiprocessor system.

During the operation of the algorithm, objects in a car may be evacuated, or relocated, to other cars. When an object is relocated, references to that object located outside of the collection region must be changed to point to the new object location. To facilitate the step of finding the references to objects in a region, many space-incremental collectors use "remembered sets." In particular, a remembered set is associated with each region and tracks memory locations containing references that point to objects in that region. Memory locations are used instead of the references themselves because remembered sets are built over time so that when the time arrives to use the references they may be stale (no longer point to objects in a region associated with that remembered set). Remembered sets may be implemented with various data structures that can be used to represent a set, such as sets, bitmaps, hash tables and bags.

When objects are evacuated from regions in the collection set, the remembered sets associated with those regions are scanned to locate references to the objects so that the references can be updated. In addition, the evacuated objects are scanned in their new locations and their references to objects in other regions or generations are duly recorded in the appropriate remembered sets or data structures.

Since non-collection threads are generally suspended during collection using space-incremental collectors, the collectors can still introduce considerable delays during the collection process. One of the largest sources of these delays is the time taken to scan the remembered sets, because the sets can be quite large and all references must be scanned.

In order to reduce the delays caused by scanning remembered sets one technique scans the remembered sets mostly concurrently with the operation of the non-collection threads. For example, remembered sets can be scanned in a two-phase process. In the first phase, which is performed mostly concurrently with the operation of the non-collection threads, remembered sets are updated when a reference location is modified by the non-collection threads or by the collector (unless the reference is located in a region that will be collected before the region associated with the remembered set) and the remembered set entries are scanned, summarized and partially sorted into associated reference location lists. Then, at the start of the second phase, which is carried out when the non-collection threads are suspended, any remaining remembered set entries for regions in the collection set are scanned and added to the appropriate reference location lists and any remaining unrecorded modifications to the reference locations are recorded. Thereafter, each reference location list is traversed to update the remembered set entries corresponding to evacuated objects.

However, even with the aforementioned technique, remembered sets may still grow large enough to cause significant delays during the updating and scanning process.

SUMMARY

In accordance with the principles of the invention, before scanning, remembered sets associated with regions in some collection set are "sequestered" (no further insertions are allowed by the non-collection threads or the collector) in order to prevent further changes. Any further changes to these sequestered remembered sets that occur before phase two of the scanning process are then handled by one or more "refinement threads." Each refinement thread is a thread that can record reference locations in remembered sets, scan entries in collection set remembered sets and update reference location lists for use in the aforementioned second phase of remembered set processing. The refinement threads operate concurrently with the operation of the non-collection threads.

For example, when a reference location is changed, one of the refinement threads determines whether the reference is to an object in a region that is in a collection set and whose remembered set is sequestered. If it is, then the refinement thread places the reference location on an appropriate reference location list for use in processing reference locations in the second scanning phase. If the reference is to an object in a region that is not in a collection set, then the refinement thread updates the appropriate remembered set (assuming that the reference is not located in a region that will be collected before or together with the region containing the object).

The refinement threads also scan reference locations in the remembered sets associated with regions in the collection set and record those reference locations containing references that still refer to objects in regions that are in the collection set on the appropriate reference location lists.

In one embodiment, each reference location list is associated with a region that is not in the collection set, but which contains reference locations, each of which contains a reference that refers to an object in a region that is in the collection set.

In another embodiment, one or more concurrent threads are used to update and scan the remembered sets until the amount of remaining work falls below a predetermined threshold. Then, all non-collection threads are stopped and the processing is finished.

In still another embodiment, after all non-collection threads have been stopped one or more refinement threads finish the processing by recording any unrecorded modifications to reference locations and by scanning unscanned remembered set entries. Then the reference location lists are scanned to update references that correspond to objects that are evacuated by the operation of the collector.

In yet another embodiment, in order to further reduce the time taken to process remembered sets, regions are organized into groups that will be collected together by assigning a collection-set level to each of the regions in a group. Then the reference location lists generated during the first phase are indexed by collection set level. This arrangement allows the lists to be processed according to collection set level so that some groups are collected more frequently than others. For example, "younger" generations with more activity can be collected more often than "older" generations with less activity.

In another embodiment, a refinement thread is a non-collection thread that is placed in refinement mode by a write barrier.

In yet another embodiment, a refinement thread is a separate concurrent refinement thread that summarizes the remaining references.

BRIEF DESCRIPTION OF THE DRAWINGS

FIG. 5 is a flowchart showing the steps in an illustrative process performed by a refinement thread for updating the remembered sets and associated reference location lists to account for changes made by non-collection threads.

DETAILED DESCRIPTION

Figure 1:
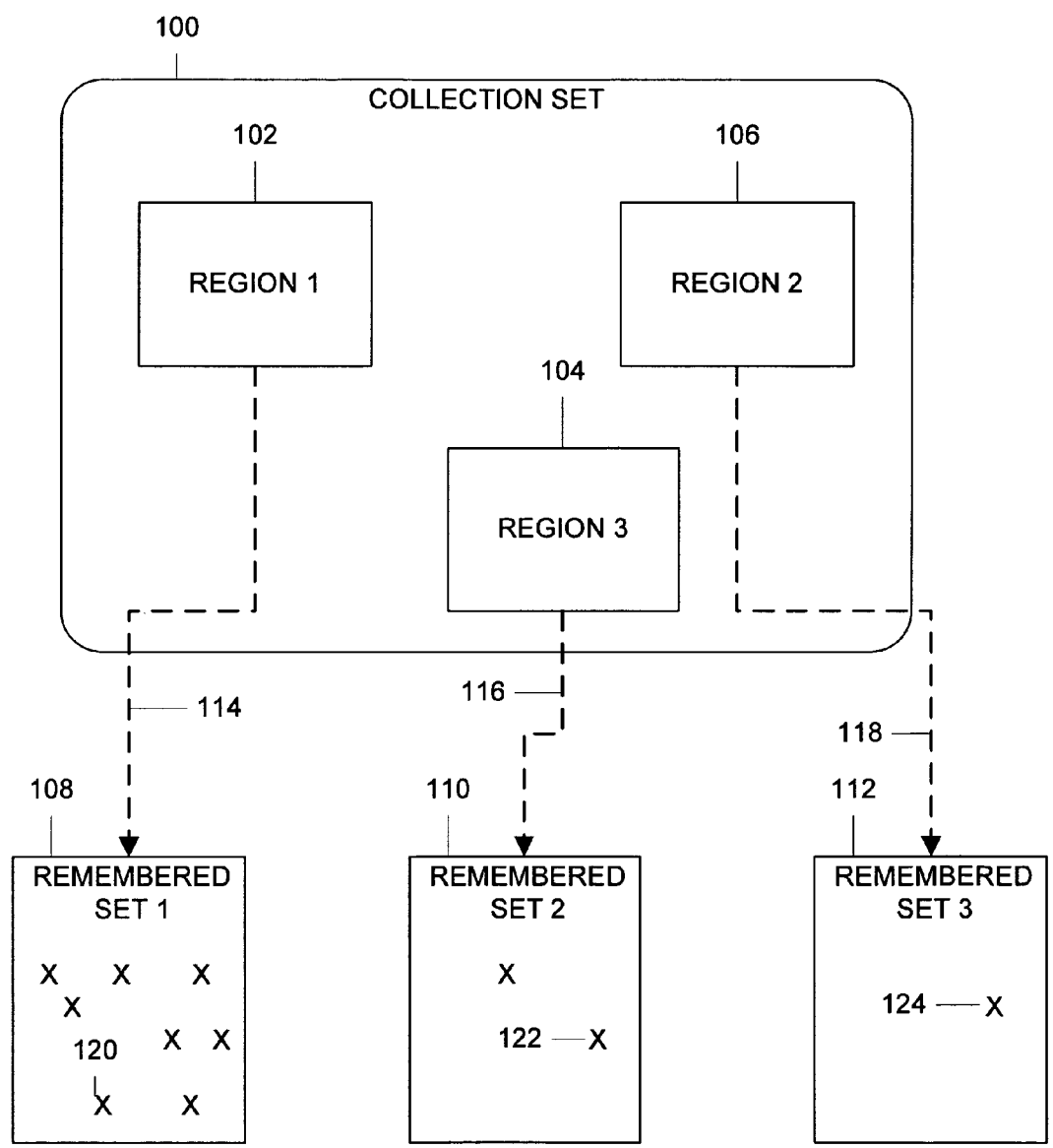
FIG. 1 is a block schematic diagram of a collection set and associated remembered sets that illustrates the relationship of remembered sets to regions in the collection set.

FIG. 1 shows a collection set 100, which as described above, comprises a predefined subset of the heap that will be used by the garbage collector during the collection process. The collection set 100 includes one or more contiguous or noncontiguous regions of which three regions, region 1 (102), region 2 (104) and region 3 (106) are shown in FIG. 1. The nature of regions 102, 104 and 106 depends on the particular collection algorithm employed. For example, if the aforementioned Train algorithm is used as the collector, each of regions 102, 104 and 106 will consist of a fixed-size, contiguous area of memory which is managed by metadata information in a car.

In accordance with the space incremental collection algorithms discussed above, each region has an associated remembered set data structure. In FIG. 1, remembered sets 108, 110 and 112 are associated with regions 102, 104 and 106, respectively, as illustrated schematically by arrows 114, 116 and 118. For example, when the Train algorithm is used as the collector, each remembered set would either be referenced by, or part of, the metadata information in the car that manages the associated region.

Each remembered set, in turn, includes entries that record the locations of references to objects in the region. For example, in FIG. 1, remembered set 108 includes eight entries including entry 120. Similarly, remembered set 110 includes two entries, such as entry 122. Remembered set 112 includes single entry 124. Those skilled in the art would understand that each remembered set might have no location entries or a large number of entries without affecting the operation of the present invention.

Figure 2:
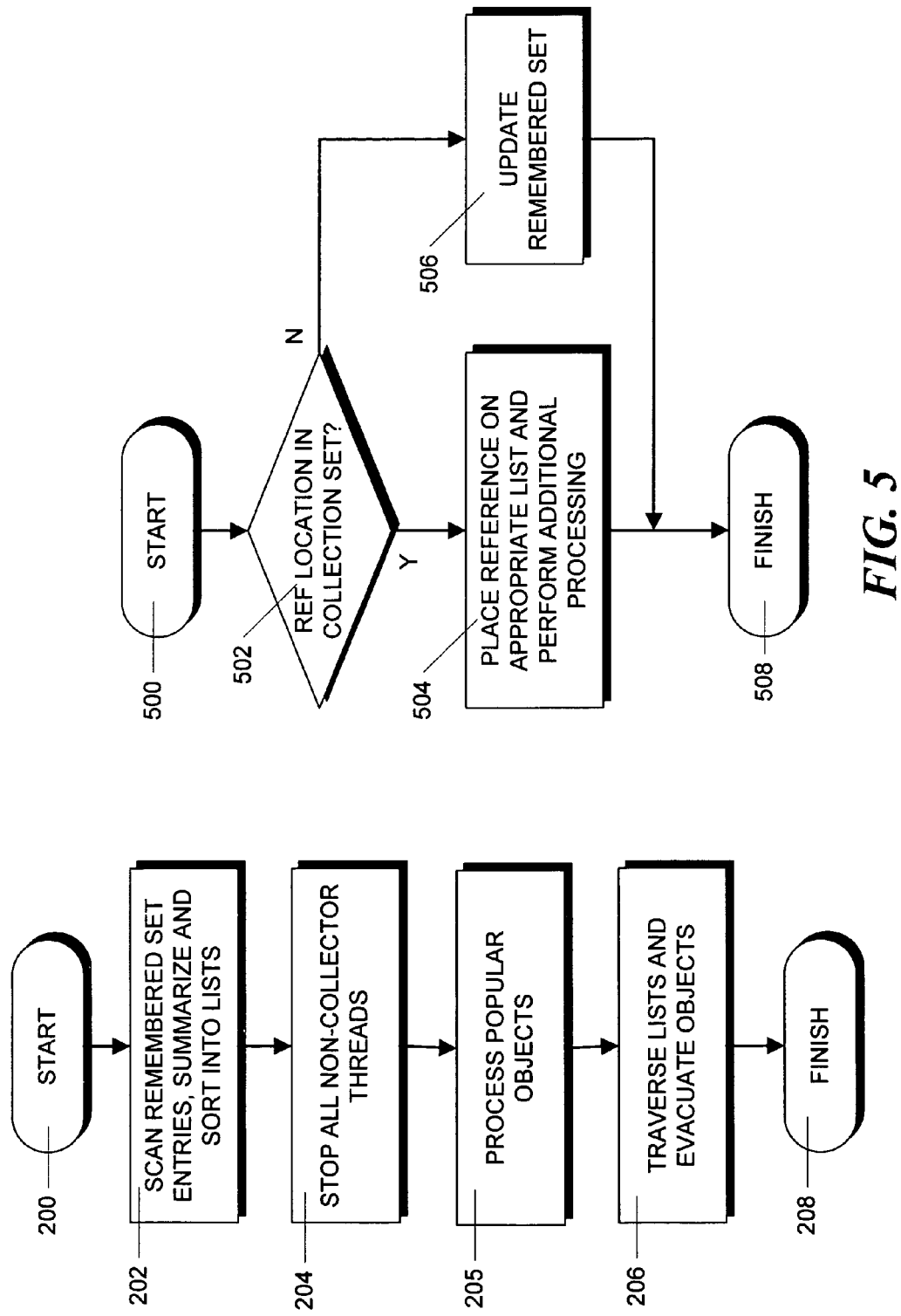
FIG. 2 is a flowchart showing the steps in an illustrative routine for processing the remembered sets in FIG. 1 using a first scanning phase and a second evacuation phase.

FIG. 2 is a flowchart that illustrates the basic operation of the invention. Processing of each remembered set is conducted in two phases. In particular, the process starts in step 200 and proceeds to step 202 where the remembered set entries are scanned, summarized and partially sorted into "scratch-pad" or reference location lists as set forth in U.S. Published Patent Application No. 20040088339. It should be noted that no objects are evacuated during this phase. In accordance with the principles of the invention, phase 202 is conducted in a mostly concurrent manner with the non-collection threads. For example, most of the processing is carried out concurrently with the non-collection threads, then all non-collection threads are stopped and the scanning and sorting process is completed. The scanning and sorting operation allows the collection process to be more efficient by eliminating stale entries (references that point to an object that is no longer in a region associated with that remembered set) and by grouping entries recording reference locations that are near each other. For example, when the Train algorithm is involved, reference locations may be sorted so that they are grouped by cars and trains that manage the regions in which the references to the objects are located. Additional processing may also be performed in order to more carefully refine the reference location lists. For example, references between objects that are in the same collection set can be ignored, since these objects will all be collected as a group. Further, before the scanning process, entries recording reference locations in more than one collection set remembered set can be eliminated as set forth in U.S. Pat. No. 6,449,626.

Figure 3:
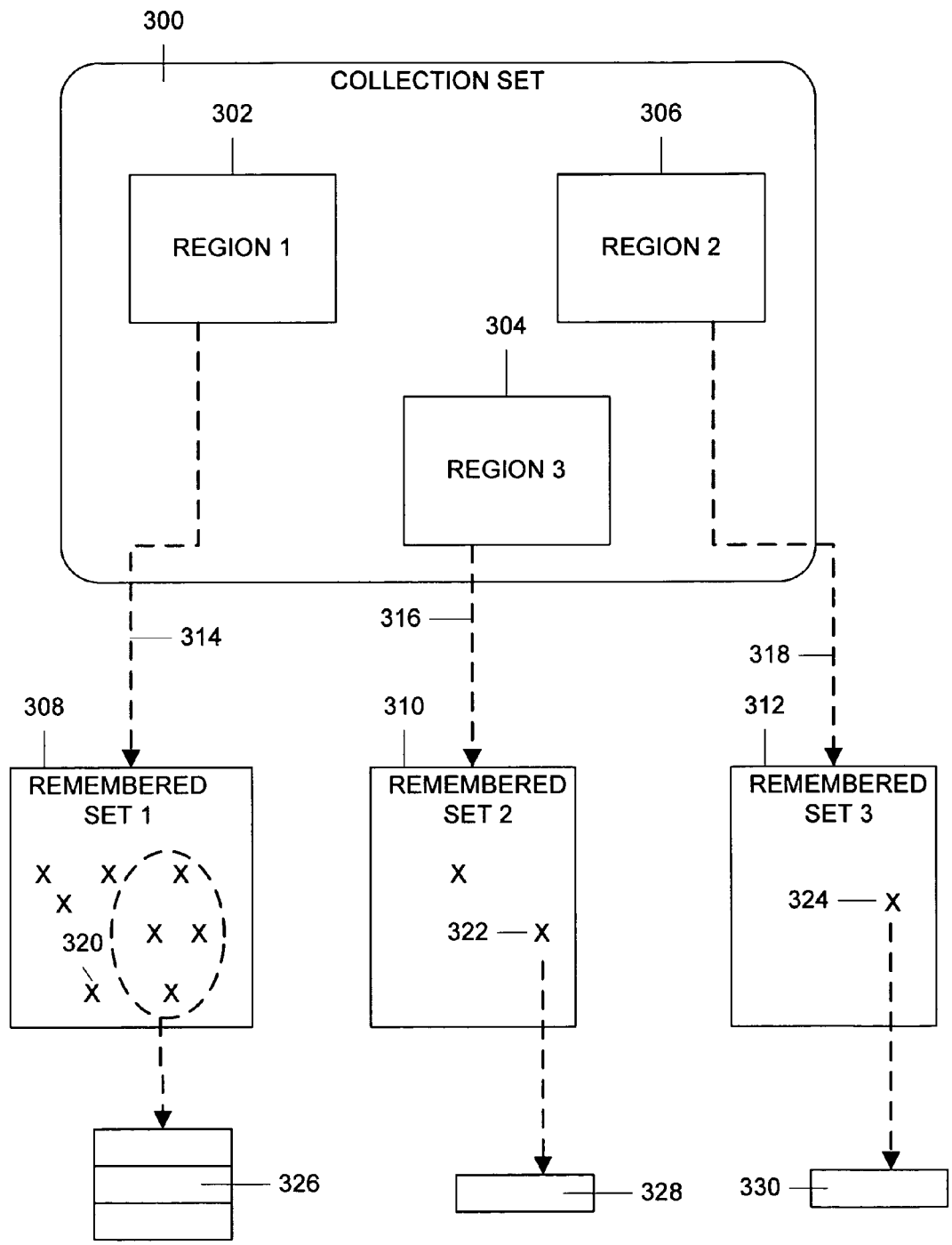
FIG. 3 is a block schematic diagram illustrating the result of processing the remembered sets in FIG. 1.

The result of the scanning and sorting process is illustrated in FIG. 3. In FIG. 3, elements that correspond to elements in FIG. 1 have been given corresponding numerals. For example, collection set 100 in FIG. 1 corresponds to collection set 300 in FIG. 3. Corresponding elements in FIGS. 1 and 3 have corresponding descriptions and will not be discussed in detail further herein. The scanning and sorting process produces a list of reference locations that includes some or all of the locations in the remembered sets. It is possible to organize these locations as a single list for each collection set of regions. However, in the particular embodiment shown, the lists are organized by each region outside an identified collection set containing references to objects in a region in that collection set. For example, as shown in FIG. 3 by dotted lines, reference location list 326 is associated with locations in remembered set 320 contained in a region outside collection set 300, reference location list 328 is associated with locations in remembered set 310 contained in a region outside collection set 300 and reference location list 330 is associated with locations in remembered set 312 contained in a region outside collection set 300. Since all entries on a reference location list are associated with a particular region, the number of entries in a reference location list may be fewer than the number of entries in the remembered set.

Returning to FIG. 2, after phase one is complete, in step 204, all non-collection threads are stopped (if they have not previously been stopped during the last part of the scanning and sorting process). Additional processing may also be performed at this stage, as set forth in step 205. For example, in the case of the Train algorithm, so-called "popular" objects may be identified, isolated and processed in conventional, well-known manners. See, for example, U.S. Pat. No. 6,434,576 for techniques for processing popular objects. Then, in step 206, any remaining summarization, or refinement, of reference locations modified by the non-collection threads is performed as described below, the objects are evacuated in accordance with the collection algorithm in use and the reference location lists are traversed so that the corresponding references can be retrieved and updated.

As discussed above, it is desirable to perform the scanning and sorting phase set forth in step 202 mostly concurrently with the operation of the non-collection threads. However, as the scanning and sorting process is being performed, the non-collection threads are adding new references, modifying existing references and making other changes that require an update to the remembered set information. Thus, some mechanism must be used to ensure that the correct updates are made.

Figure 4:
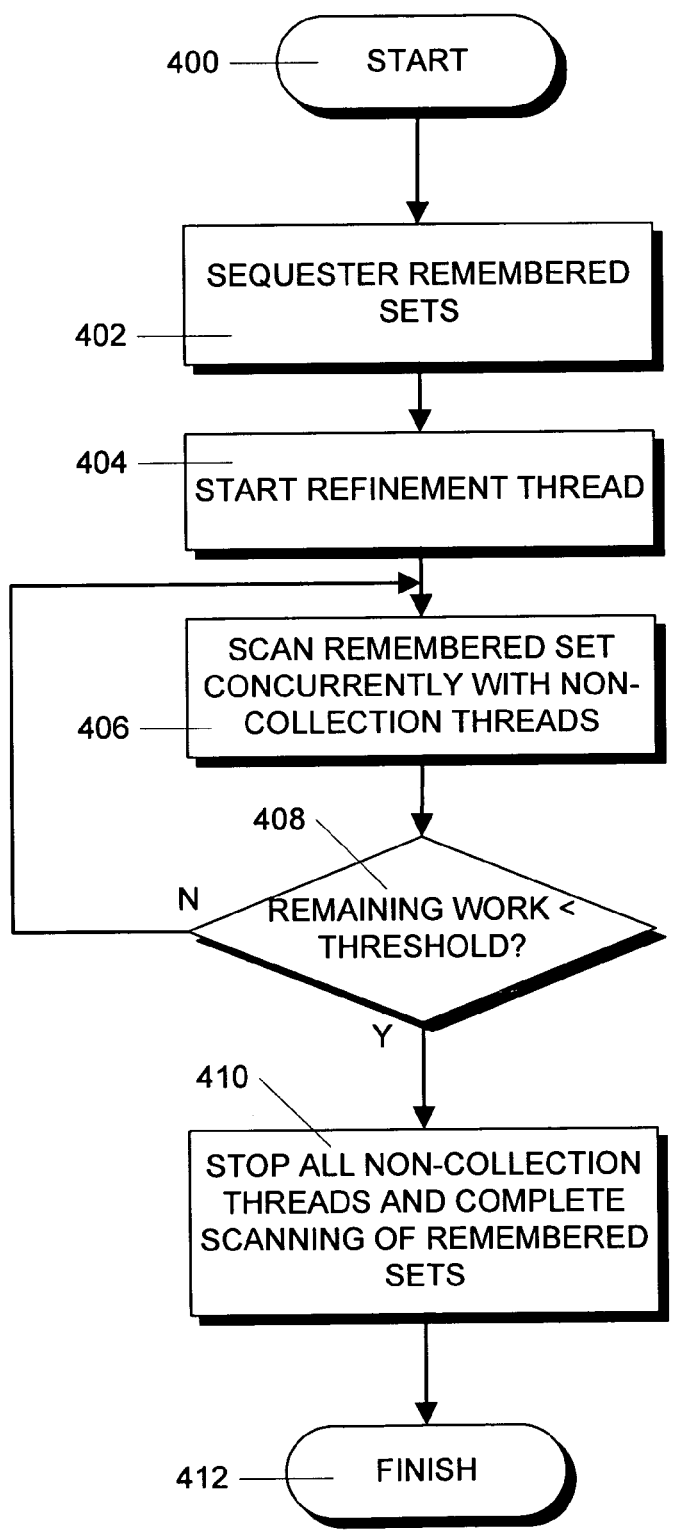
FIG. 4 is a flowchart showing the steps in an illustrative process for scanning the remembered sets in the first scanning phase as shown in FIG. 2 in a mostly concurrent manner.

In accordance with one embodiment of the invention, the scanning and sorting process is carried out in accordance with the steps illustrated in FIG. 4. This process begins with step 400 and proceeds to step 402 where the remembered sets for regions marked as part of a collection set are "sequestered" by permitting no new additions or updates to the remembered sets by any thread. Instead, further updates are conducted by one or more "refinement threads" which begin the refinement process in step 404.

In one embodiment of the invention, the "refinement threads" could be the non-collection threads themselves. In particular, a write barrier could be enabled to cause the non-collection threads to perform the necessary additions or updates. In another embodiment, a separate refinement thread performs the additions or updates concurrently with the scanning and sorting operations on the remembered sets and the operation of the non-collection threads. Alternatively, all non-collection threads can be stopped and any remaining unrecorded modified references can be processed by a separate refinement thread.

After it is sequestered, each remembered set is then scanned and sorted as described above concurrently with the operation of the non-collection threads as set forth in step 406. Periodically, during the scanning operation, the collector thread checks to determine whether the remaining work is less than a predetermined threshold as set forth in step 408. If not, then the scanning and sorting operation continues. However, if it is determined in step 408 that the remaining work is less than the threshold, then, in step 410, all non-collection threads are stopped and the scanning and sorting of the remembered sets is completed. The scanning and sorting step then ends in step 412.

The operation of a refinement thread is set forth in FIG. 5. This thread operates when a reference is added or modified by the non-collection threads. The process starts in step 500 and proceeds to step 502 where a determination is made whether the reference location is in the collection set. The manner in which this determination is made depends on the particular collection algorithm in use. For example, if the Train algorithm is being used, then the thread can test to determine whether objects in a car are in the collection set. Other collectors can use data structures or bitmaps that are similar to cars to perform the determination. If so, the reference location is placed on the reference location list associated with the remembered set for that car or region as set forth in step 504. Other processing may also be performed at this point. For example, to support to detection and isolation of newly popular objects, per-object counts may be kept for objects in the collection-set and these counts can later be used to identify those objects that should now be isolated. If, as determined in step 502, the reference location is not in the collection set, then in step 506, the remembered set for that region is updated. The process then finishes in step 508.

The process set forth in FIG. 4 can significantly reduce the time necessary to scan the remembered sets. However, it is still possible to choose for collection a region with a very large remembered set thereby still incurring a significant delay for scanning that remembered set. For example, in certain collectors including those that implement the Train algorithm without employing a "younger" generation, there is a significant amount of direct allocation in the generation because there is only one generation. Therefore, in accordance with the principles of the invention, the time required to scan remembered sets can be reduced by collecting "younger" regions periodically and more often than "mature" regions.

Specifically, in accordance with another embodiment of the invention, a collection set "level" (CS-level) flag is associated with each region. The collection set level flag indicates objects in that region that will be collected as a group during the evacuation phase of the collection. "Young" regions typically have a low CS-level flag value (for example, "0"). More "mature" regions containing objects that have survived one collection may have a CS-level flag value of "1" and other regions may have a higher CS-level flag value, such as "2." Regions not part of any collection set are given a distinguished maximum value. Also, all regions have a separate flag indicating whether they are part of the current collection set. This flag is used, for example, for determining if a reference location is in a region that is part of the current collection set.

Figure 6:
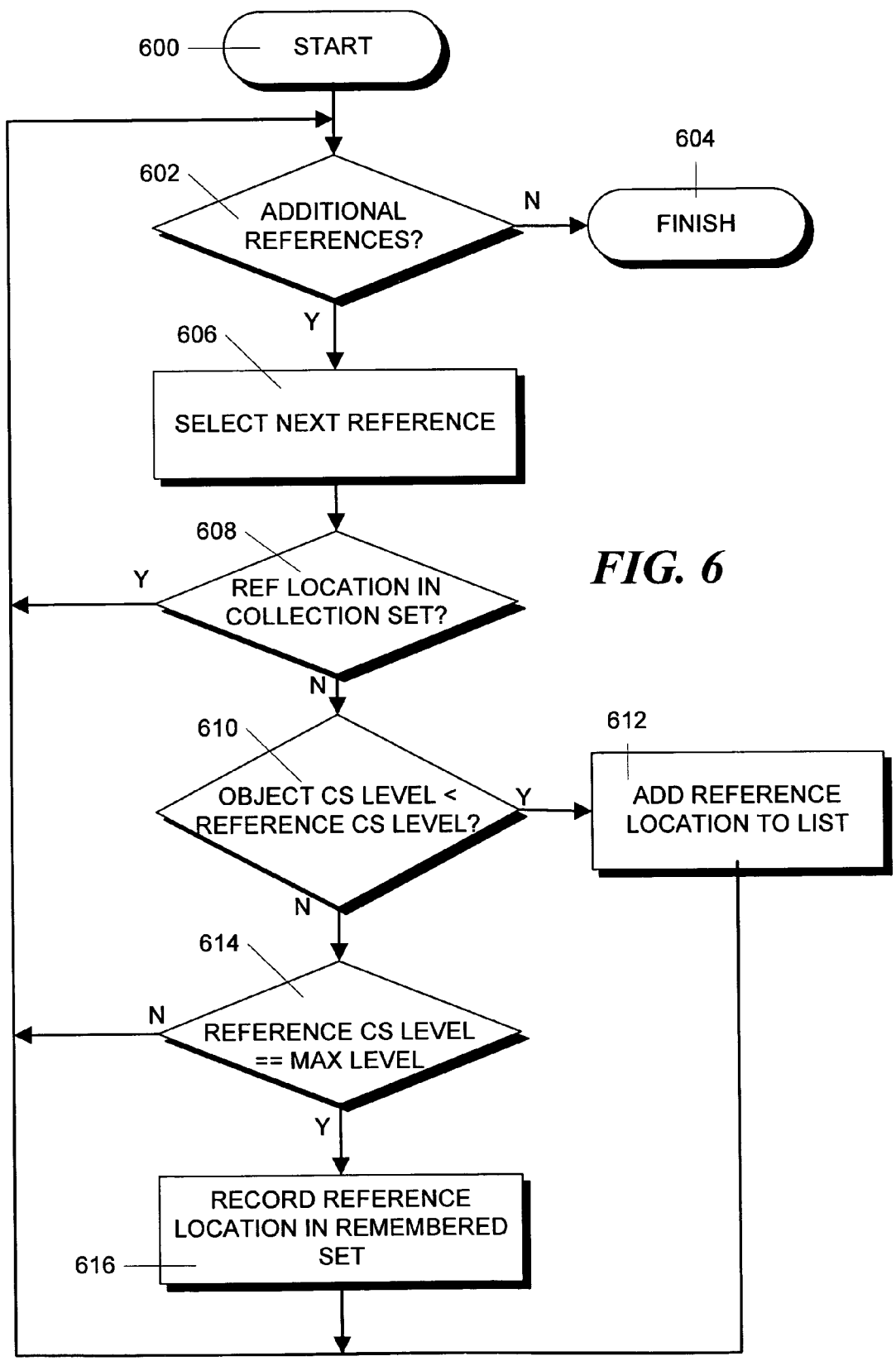
FIG. 6 is a flowchart showing the steps in an illustrative process for scanning the remembered sets in the first scanning phase as shown in FIG. 2 in a mostly concurrent manner and which uses a collection set level to group objects that should be evacuated together.

The scanning and sorting process is then modified so that the reference location lists associated with the remembered sets are indexed by CS-level flag values. Thus, each region will have an array of lists, each indexed by the CS-level flag value. An exemplary process for scanning and sorting a remembered set for region using CS-level flag values is shown in FIG. 6. This process begins in step 600 and proceeds to step 602 where a determination is made whether additional remembered set entries remain to be scanned. If all entries have been scanned, then the process finishes in step 604. Alternatively, if it is determined, in step 602, that additional remembered set entries remain to be scanned, then, in step 606, the next entry is selected.

In step 608, a determination is made whether the reference location in that entry is in the collection set, for example, by examining the flag associated with region containing the reference location. If the reference location is in the collection set, the referenced object will be evacuated during the next collection. Accordingly, nothing need be done and the process returns back to step 602 to determine whether additional entries need to be scanned.

If it is determined in step 608 that the reference location is not in the collection set, then the process proceeds to step 610 where a further determination is made whether the CS-level flag value of the region containing the object is less than the CS-level flag value of the region containing the reference (reference region). If so, the region containing the object will be collected either before, or at the same time as, the reference region. In this case, in step 612, the reference location is added to the reference location list associated with the reference region and indexed by the CS-level flag value of the region containing the object, and the process proceeds back to step 602 to determine whether further remembered set entries remain to be scanned.

Alternatively, if the CS-level flag value of the region containing the object is greater than, or equal to, the CS-level flag value of the reference region, then the process proceeds to step 614 where a further determination is made whether the CS-level flag value of the region containing the reference is equal to a predetermined maximum CS-level flag value allowed. If so, this indicates that the referenced object is not part of any collection set and the process proceeds to step 616 where the reference location is recorded in the remembered set associated with the region containing the object. Alternatively, if, in step 614, it is determined that the CS-level flag value of the region containing the object is not equal to a predetermined maximum CS-level flag value allowed, then the process proceeds back to step 602 to determine whether further remembered set entries remain to be scanned.

Figure 7:
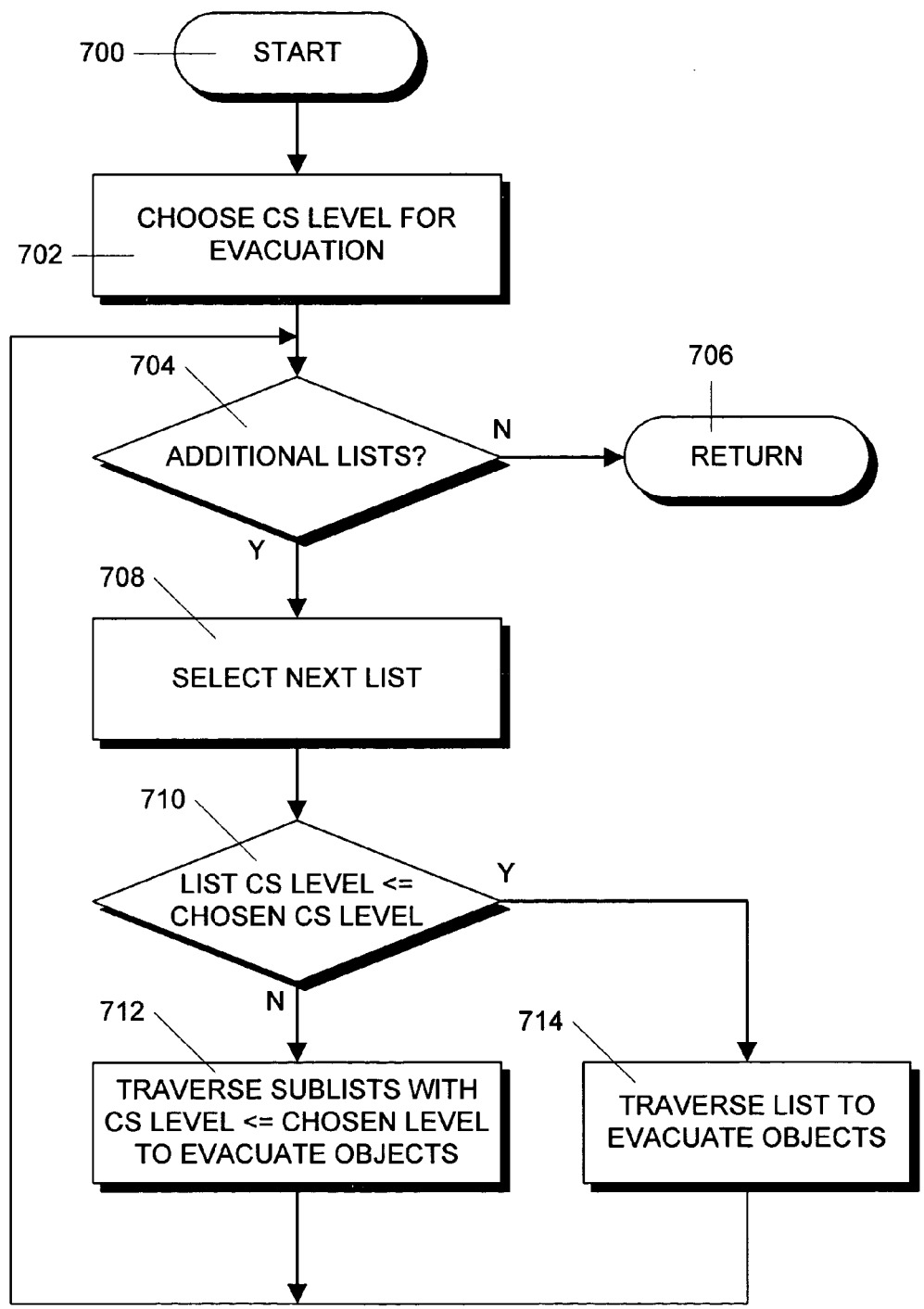
FIG. 7 is a flowchart showing the steps in an illustrative process for evacuating objects in the second evacuation phase as shown in FIG. 2 using the collection set levels assigned during the first scanning phase as set forth in FIG. 6.

Once all remembered set entries have been scanned and the associated reference location lists have been indexed using the CS-level flag value in accordance with the process set forth in FIG. 6, evacuation of objects in the collected regions can be performed as set forth in step 206. An exemplary process for performing traversal of the lists is set forth in FIG. 7. This process starts in step 700 and proceeds to step 702 where a particular CS-level flag value is chosen for evacuation. Choosing a particular value also implicitly choose all values less than the chosen value. For example if value "1" is chosen, then all list entries with CS-level flag values of "1" and "0" will be evacuated.

In step 704, a determination is made whether additional reference location lists remain to be processed. If not, then the process returns in step 706. Alternatively, if, in step 704, it is determined that additional reference location lists need to be processed, then in step 708, the next list is selected for processing. In step 710, a determination is made whether the CS-level flag value of the selected list is less than or equal to the CS-level flag value chosen for processing. If so, the process proceeds to step 714 where the list is traversed to evacuate the objects contained in the list. The process illustrated in FIG. 7 allows separate groups to be processed at different intervals. Thus, "younger" regions with lower CS-level flag values can be processed more often than "older" regions.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different collection algorithms, remembered set data structures and scanning techniques other than those specifically described could be used. The order of the process steps may also be changed without affecting the operation of the invention. Other aspects, such as the specific process flow, as well as other modifications to the inventive concept are intended to be covered by the appended claims.

What is claimed is:

1. A method operable in a space-incremental garbage collector for processing remembered sets, each remembered set associated with a heap memory region, wherein the garbage collector operates on a collection set having at least one region therein, the method comprising:
   (a) sequestering remembered sets associated with regions in the collection set;
   (b) if a change is made to a reference location containing a reference that refers to an object in a region that is not in the collection set, updating the remembered set associated with that region;
   (c) if a change is made to a reference location containing a reference that refers to an object in a region that is in the collection set, recording the reference location on at least one reference location list; and
   (d) scanning reference locations in remembered sets associated with regions in the collection set and recording on at least one reference location list those reference locations containing references that still refer to objects in regions that are in the collection set.

2. The method of claim 1 wherein steps (a)-(d) are performed concurrently with the operation of non-collection threads.

3. The method of claim 1 wherein each reference location list is associated with a region that is not in the collection set and contains reference locations, each of which refers to an object in a region that is in the collection set.

4. The method of claim 1 further comprising:
   (e) stopping the operation of all non-collection threads;
   (f) after step (e), processing any unrecorded modifications to reference locations in accordance with steps (b) and (c); and
   (g) after step (e), scanning remembered set entries not scanned in step (d) for regions in the collections set and recording reference locations that still refer to objects in regions in the collection set on at least one reference location list.

5. The method of claim 4 further comprising, after steps (e)-(g) have been completed, scanning reference location lists to update references to objects moved during operation of the garbage collector.

6. The method of claim 4 wherein step (e) is performed when the work to be performed in steps (c)-(d) falls below a predetermined threshold.

7. The method of claim 1 wherein step (d) comprises, for each remembered set associated with a region in the collection set, scanning memory ranges associated with the entries of that remembered set and recording reference locations in the memory ranges on at least one reference location list.

8. The method of claim 7 wherein step (d) comprises eliminating duplicate entries before the memory ranges are scanned.

9. The method of claim 1 wherein step (b) comprises determining whether the reference location is located in a region that will be collected no later than the region that is associated with the remembered set and if so, not updating the remembered set.

10. The method of claim 1 wherein step (c) comprises determining whether the reference location is located in a region that will be collected no later than the sequestered region that is associated with the remembered set and if so, not recording the reference on a reference location list.

11. The method of claim 1 wherein step (d) comprises:
    (d1) associating a collection set level value with each region:
    (d2) for each scanned reference location in a region that is not in the collection set and has a collection set level value greater than the collection set level value of a region containing an object to which a reference in the reference location refers, recording the reference location on at least one reference location list; and
    (d3) for each scanned reference location in a region that is not in the collection set, has a collection set level value equal to a predetermined maximum collection set level value and contains a reference that refers to an object in a region having a collection set level value equal to the predetermined maximum collection set level value, recording the reference location in a remembered set associated with a region containing an object to which a reference in the reference location refers.

12. The method of claim 11 further comprising:
    (e) using reference location lists to evacuate objects reachable from regions having a collection set level value less than, or equal to, a selected collection set level value.

13. The method of claim 1 wherein steps (c)-(d) are performed by a non-collection thread that encounters a write barrier.

14. The method of claim 1 wherein steps (c)-(d) are performed by a refinement thread that is separate from the non-collection threads.

15. Apparatus operable in a space-incremental garbage collector for processing remembered sets, each remembered set associated with a heap memory region, wherein the garbage collector operates on a collection set having at least one region therein, the apparatus comprising:
    a physical memory comprising the heap memory region associated with a processor;
    a mechanism that sequesters remembered sets associated with regions in the collection set;
    a mechanism operable if a change is made to a reference location containing a reference that refers to an object in a region that is not in the collection set, that updates the remembered set associated with that region;
    a mechanism operable if a change is made to a reference location containing a reference that refers to an object in a region that is in the collection set, that records the reference location on at least one reference location list; and
    a mechanism that scans reference locations in remembered sets associated with regions in the collection set and records on at least one reference location list those reference locations containing references that still refer to objects in regions that are in the collection set.

16. The apparatus of claim 15 wherein the mechanism that sequesters remembered sets associated with regions in the collection set, the mechanism that updates the remembered sets, the mechanism that records reference locations and the mechanism that scans reference locations in remembered sets operate concurrently with the operation of non-collection threads.

17. The apparatus of claim 15 wherein each reference location list is associated with a region that is not in the collection set and contains reference locations, each of which refers to an object in a region that is in the collection set.

18. The apparatus of claim 15 further comprising:
    a mechanism that stops the operation of all non-collection threads;
    a mechanism operable after all non-collection threads have been stopped, that cooperates with the mechanism that updates the remembered sets and the mechanism that records reference locations to process any unrecorded modifications to reference locations; and a mechanism operable after any unrecorded modifications to reference locations have been processed, that scans remembered set entries not scanned by the mechanism that scans reference locations in remembered sets for regions in the collection set and that records reference locations that still refer to objects in regions in the collection set on at least one reference location list.

19. The apparatus of claim 18 further comprising a mechanism operable after all reference locations in remembered sets corresponding to regions in the collection set have been processed, that scans reference location lists to update references to objects moved during operation of the garbage collector.

20. The apparatus of claim 18 wherein the mechanism that stops all non-collection threads operates when the work to be performed by the mechanism that updates the remembered sets and the mechanism that records reference locations falls below a predetermined threshold.

21. The apparatus of claim 15 wherein the mechanism that scans reference locations in the remembered sets comprises a mechanism that operates on each remembered set associated with a region in the collection set, to scan memory ranges associated with the entries of that remembered set and to record reference locations in the memory ranges on at least one reference location list.

22. The apparatus of claim 21 wherein the mechanism that scans reference locations in the remembered sets comprises a mechanism that eliminates duplicate entries before memory ranges are scanned.

23. The apparatus of claim 15 wherein the mechanism that updates remembered sets comprises a mechanism that determines whether, for a remembered set, a reference location is located in a region that will be collected no later than the region that is associated with the remembered set and, if so, does not update the remembered set.

24. The apparatus of claim 15 wherein the mechanism that records reference locations on at least one reference location list comprises a mechanism that determines whether the reference location is located in a region that will be collected no later than the sequestered region that is associated with the remembered set and if so, does not record the reference on a reference location list.

25. The apparatus of claim 15 wherein the mechanism that scans reference locations in remembered sets comprises:

a mechanism that associates a collection set level value with each region:

a mechanism that operates on each scanned reference location in a region that is not in the collection set and has a collection set level value greater than the collection set level value of a region containing an object to which a reference in the reference location refers, to record the reference location on at least one reference location list; and a mechanism that operates on each scanned reference location in a region that is not in the collection set, has a collection set level value equal to a predetermined maximum collection set level value and contains a reference that refers to an object in a region having a collection set level value equal to the predetermined maximum collection set level value, to record the reference location in a remembered set associated with a region containing an object to which a reference in the reference location refers.

26. The apparatus of claim 25 further comprising a mechanism that uses reference location lists to evacuate objects reachable from regions having a collection set level value less than, or equal to, a selected collection set level value.

27. The apparatus of claim 15 wherein the mechanism that updates remembered sets and the mechanism that records reference locations on at least one reference location list are part of a write barrier started by a non-collection thread.

28. The apparatus of claim 15 wherein the mechanism that updates remembered sets and the mechanism that records reference locations on at least one reference location list are part of a refinement thread that is separate from the non-collection threads.

29. A computer program product operable in a space-incremental garbage collector for processing remembered sets, each remembered set associated with a heap memory region, wherein the garbage collector operates on a collection set having at least one region therein, the computer program product comprising a computer usable medium having computer readable program code thereon, including:

program code for sequestering remembered sets associated with regions in the collection set;

program code operable if a change is made to a reference location containing a reference that refers to an object in a region that is not in the collection set, for updating the remembered set associated with that region;

program code operable if a change is made to a reference location containing a reference that refers to an object in a region that is in the collection set, for recording the reference location on at least one reference location list; and program code for scanning reference locations in remembered sets associated with regions in the collection set and recording on at least one reference location list those reference locations containing references that still refer to objects in regions that are in the collection set.

* * * * *

UNITED STATES PATENT AND TRADEMARK OFFICE
CERTIFICATE OF CORRECTION

PATENT NO. : 7,650,350 B1 Page 1 of 1
APPLICATION NO. : 11/131827
DATED : January 19, 2010
INVENTOR(S) : Alexander T. Garthwaite It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1281 days.

Signed and Sealed this

Twenty-third Day of November, 2010

David J. Kappos
*Director of the United States Patent and Trademark Office*